UNITED STATES PATENT OFFICE 2,396,454

CONVEYING METHOD

Clarence W. Bareis, Wyandotte, Mich., assignor to The Pennsylvania Salt Manufacturing Company, Philadelphia, Pa., a corporation of Pennsylvania No Drawing. Application February 17, 1943, Serial No. 476,178

5 Claims. (Cl. 198—213)

This invention relates to conveying materials in screw conveyors and the like. Particularly it relates to a method of conveying solid materials which tend to coalesce or congeal in the conveying means.

In the conveying of certain granular free flowing freshly prepared solid materials which are at a temperature higher than that of the conveying means it has been observed that a hard glazed deposit, difficult to remove, is eventually built up on the conveyor walls. This caking or glazing appears to be due to the passage of the screw over the surface of the conveyor walls which "butters" a fresh layer of powder on top of the stationary layer already in place. The "buttering" action will continue progressively until the hard glazed layer is formed. This deposit makes necessary the use of additional power to operate the conveyor and in most cases its shutdown to avoid breaking the driving mechanism.

According to this invention the temperature of the freshly prepared material is maintained. This results in the total elimination of the glazing or building up of a deposit on the conveying mechanism.

An application of this invention is in the conveying of bleaching powder. It is known that the reaction between chlorine and slaked lime is exothermic, and because of this freshly prepared bleach is warmer than the surrounding atmosphere.

When this warm powder (which contains some mechanically held water) comes into contact with the comparatively cold metal surface of the conveyor, moisture condenses on the metal surface or on the cooled portion of the bleaching powder resulting in the caking of the material and in its being "buttered" onto the surface of the conveyor. This "buttering" soon results in the stoppage of the conveyor and necessitates a shutdown for cleaning purposes.

The invention overcomes this difficulty by simply maintaining the temperature of the material above the temperature at which caking takes place and one inexpensive way of doing this, is by keeping the wall of the conveyor warm, or at least preventing the loss of heat through the wall, by insulating the conveyor wall or preferably by steam jacketing the conveyor. Merely insulating the conveyor partially overcomes the trouble, but the application of the steam jacket is very effective, the powder in the conveyor and between the conveyor screw or blades and the housing remaining in its original form without any tendency to cake.

Thus, it has been found that bleaching powder can be screw-conveyed without the formation of a hard glazed surface in contact with the screw by simply maintaining its temperature substantially as freshly prepared.

I claim:

1. The method of conveying in a conveyor of the screw type a solid granular material which is free flowing as prepared at an elevated temperature and which tends to form a hard glazed layer at a lower temperature while in contact with the screw and conveyor wall which consists in maintaining said material substantially at its temperature of preparation while it is in the conveyor.

2. The method of claim 1 wherein the conveyor is heated.

3. The method of claim 1 wherein heat is applied to the material in the conveyor.

4. The method of conveying, in a conveyor of the screw type, bleaching powder which is free flowing as prepared at an elevated temperature and which tends to form a hard glazed layer at a lower temperature while in contact with the screw and conveyor which consists in maintaining said powder substantially at its temperature of preparation while it is in the conveyor.

5. The method of claim 4 wherein the conveyor is heated.

CLARENCE W. BAREIS.